(12) United States Patent
Razavi (10) Patent No.: US 8,426,534 B2
(45) Date of Patent: Apr. 23, 2013

(54) IMPACT COPOLYMER IN SINGLE REACTOR

(75) Inventor: Abbas Razavi, Mons (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 328 days.

(21) Appl. No.: 12/065,462

(22) PCT Filed: Aug. 25, 2006

(86) PCT No.: PCT/EP2006/065675
§ 371 (c)(1),
(2), (4) Date: Aug. 7, 2008

(87) PCT Pub. No.: WO2007/107189
PCT Pub. Date: Sep. 27, 2007

(65) Prior Publication Data
US 2009/0118447 A1    May 7, 2009

(30) Foreign Application Priority Data

Sep. 2, 2005 (EP) ..................... 05108090

(51) Int. Cl.
*C08F 4/646* (2006.01)
*C08F 4/6592* (2006.01)
*C08F 10/06* (2006.01)

(52) U.S. Cl.
USPC ........... 526/113; 526/114; 526/160; 526/351; 526/943

(58) Field of Classification Search ................. 526/116, 526/160, 351, 943, 113, 114; 502/113, 152
See application file for complete search history.

(56) References Cited

U.S. PATENT DOCUMENTS

| | | | |
|---|---|---|---|
| 5,847,059 A | 12/1998 | Shamshoum et al. | |
| 6,143,683 A | 11/2000 | Shamshoum et al. | |
| 6,316,558 B1 * | 11/2001 | Kaneko et al. | 526/133 |
| 6,362,125 B1 | 3/2002 | Shamshoum et al. | |
| 6,518,377 B1 | 2/2003 | Shamshoum et al. | |
| 6,559,089 B1 * | 5/2003 | Razavi et al. | 502/152 |
| 2001/0039314 A1 | 11/2001 | Mehta et al. | |
| 2001/0044506 A1 | 11/2001 | Mehta et al. | |
| 2003/0153689 A1 | 8/2003 | Mehta et al. | |

* cited by examiner

*Primary Examiner* — Caixia Lu (57) ABSTRACT

This invention relates to the field of impact copolymers and their preparation in a single reactor.

2 Claims, 6 Drawing Sheets

IMPACT COPOLYMER IN SINGLE REACTOR

This invention relates to the field of impact copolymers and their preparation in a single reactor without addition of comonomer for the preparation of the rubber phase.

Polypropylene homopolymers exhibit very valuable material properties compared to other polyolefins, yet at temperatures below 0° C., they become extremely brittle and practically useless for a variety of applications involving impact strength. To overcome this deficiency, hetero-phasic impact copolymers have been developed that provide the highest level of impact strength, especially at sub-ambient temperatures.

Impact copolymer resins consist of two major components:
the high crystallinity, high rigidity isotactic homopolymer, traditionally prepared in the first stage in one or two loop reactors or continuously stirred tank reactors; and
the second high viscosity rubbery component consisting of ethylene-propylene copolymer produced in the second stage in one or two gas phase reactors.

The extruded mixture of the two phases contains, a continuous, rigid, homopolymer matrix phase, and a finely dispersed phase of ethylene-propylene rubber (EPR) particles of about 5 nm in size.

Suitable impact copolymers ideally should satisfy three main requirements.
Production of an isotactic homopolymer of propylene phase with a very high isotacticity index (II) to maximise the stiffness.
Production of an Ethylene-propylene Rubber Phase exhibiting an elastic behaviour for the whole range of required temperature.
Optimum degree of homogeneous dispersion of the rubbery phase and matrix after the extrusion.

Purity, intrinsic viscosity and fine structure of the ethylene-propylene rubber (EPR) must meet specified requirements. Low polyethylene "impurity" and low atactic polypropylene (PP) fraction in the rubbery phase improves impact properties. A completely random EPR fraction performs much better than EPR that is microstructurally, partially blocky. Additionally, since the ductile/brittle transition temperature in impact copolymer depends on rubber viscosity, the higher the intrinsic viscosity of the rubber the better the final impact property. Too high rubber viscosity however leads to a difficult dispersion process and may again negatively affect the impact properties.

Imparting potentially antagonistic properties such as easy processing, rigidity and impact to high performance polyolefin resins has always been a challenge to scientists and engineers. It requires quite ingenious catalyst formulations and process-engineering design. Modern multi-reactor processes, employing state of the art catalyst systems, may overcome these challenges. Selecting the proper catalyst formulation and judiciously controlling the polymerisation conditions in each reactor enable sequential and in-situ production of blends of polymers with distinctly different yet complementary properties. In multi-phasic resins an ideal compromise of counteracting properties can be reached. Impact copolymer have thus been produced in multistage reactor configurations. Industry has overcome successfully most engineering- and catalyst formulation-related challenges. The challenges that had to be overcome were the following:

Catalyst lifetime control related to thermal and chemical stability; it is important that the catalysts particles survive during the whole residence period in the reactors while being transformed into polymer particles. A proper balance between catalyst's kinetic behaviour, lifetime and residence time must be reached.

Catalyst residence time in each reactor; the catalyst's particle must spend in each reactor, the time necessary to obtain the desired homopolymer/EPR composition in the final product.

The formation of atactic polypropylene fraction must be avoided since these fractions do contribute neither to rigidity nor to the impact resistance properties.

The formation of high-density polyethylene must be avoided in the second reactor.

A good dispersion and distribution of rubber particles within homopolymer matrix must be obtained.

Good balance between catalyst morphology and porosity on one hand and bulk density and settling efficiency on the other hand.

Good balance between morphology and porosity as well as fragmentability and mechanical crush resistance of the catalyst.

Classically, Ziegler-Natta (ZN) catalyst systems were employed in these processes. The latest generation of $MgCl_2$ supported ZN catalyst have provided a very good basis for the production of impact copolymers (ICP) by providing porous, spherical catalysts which can first homopolymerise propylene in the first reactor while still maintaining shape and porosity, and incorporate the ethylene-propylene rubber (EPR) with the homopolymer matrix in a second, usually a gas phase reactor. The excellent morphology and porosity/bulk density balance of the catalysts permitted the formation of rubber particles with desired shape, size and size distribution thereby facilitating dispersion during extrusion. The variety of chains created by the multitude of active species with $TiCl_3$ based ZN catalysts, even with their latest generations, exhibited a poly-disperse character. The homopolymer chains consisted of different populations that had different degrees of stereo-regularity. Their molecular weight dependent copolymerisation behaviour led to the incorporation of the co-monomers in the lower end part of the molecular weight spectrum. Due to the presence of a non negligible fraction of these short, highly copolymerised isotactic chains the ZN based polymers always contained a soluble fraction, measured as % of xylene soluble. These "extractable" were particularly deleterious to the optical and mechanical properties of the resins. In addition, the fine structure of the rubber with a non-random composition and the ubiquitous presence of some high density polyethylene fraction were unavoidable drawbacks inherent to ZN catalyst nature.

Metallocene catalysts being composed of uniform active species provide excellent control of the molecular weight and molecular weight distribution. Metallocene structures are chirotopic in their activated forms with homotopic and diastereotopic coordination positions, essential for enantioface differentiation during the coordination/insertion of prochiral monomers such as propylene. Their chirality, unlike their ZN catalyst counterparts, is of molecular nature. It stems from the immediate environment of the transition metal and is imparted by the particular spatial arrangement of the engulfing ancillary ligand. Internal or external modifiers are not needed nor employed. In metallocene catalysts every active site molecule has the same unique properties and produces identical polymer chains.

Contrary to the ZN catalyst systems, metallocene catalyst's ligand environment is less rigid and imparts certain flexibility to the active site permitting the formation of monomer inversions, the so-called 2-1 and 1-3 insertions, in the backbone of the polymer chains. These "defects" are essential in imparting unique optical properties to metallocene product by formation of small and uniform sized spherulites in solid state. In addition to different regio-selectivities, the chemo-selectivity of the catalyst and sequence distribution in the final polymers produced with ZN and with metallocene catalysts are very different. For example, having the same amount of ethylene introduced in the feed can result in copolymers with different ethylene content depending on the type of catalyst that has been employed, ZN-based copolymers having less comonomer incorporated than metallocene-based copolymers. Furthermore, having the same amount of ethylene units, as comonomer, in a copolymer with similar molecular weight, made with different catalysts, results in different melting point and crystallinity. These attributes are very important in the preparation of ethylene-propylene copolymer that are essential components in poly-phasic resins such as impact copolymers (ICP). The ZN catalysts are known to produce "blocky" copolymers, where part of incorporated comonomer is "wasted" by not providing any additional melting point and crystallinity depression effects. Most metallocene catalysts are co-polymerising ethylene and propylene in a random fashion and provide much better "use" of incorporated comonomer to effectively lower the crystallinity and melting point. One generation of metallocene catalysts is capable of copolymerising ethylene and propylene in an alternating manner thereby efficiently providing copolymers with desired properties. To produce alternating copolymers, metallocene structures with $C_1$ symmetry must be employed. In these systems the kinetic chemo-selectivities towards the two comonomers need to be sufficiently different to preferentially select each of the comonomers at different coordination site. Moreover the site at which propylene coordinates must be stereo-selective.

In order for metallocene catalysts to seriously challenge the position of ZN in the impact co-polymer business, however, catalysts morphology and porosity/bulk density balance must undergo further improvements. Another challenge concerns the intrinsic viscosity of EPR rubber produced with metallocene catalysts. Most metallocene catalysts fail to provide high molecular weight EPR due to their particular chain termination reactions with ethylene at 2-1 inserted chain terminals.

The present methods, whether with ZN or with metallocene catalyst systems, thus present several drawbacks, such as the limited catalyst life time, the use of more than one reactors and the catalyst's residence time in each reactor, the formation of atactic polymer during the first stage, the formation of polyethylene in the second stage, poor dispersion and distribution of rubber particles within the homopolymer matrix.

There is thus a need to develop a new method for preparing ICP that overcomes these difficulties.

It is an aim of the present invention to prepare impact copolymers of propylene in a single reactor.

It is also an aim of the present invention to prepare impact copolymers of propylene that do not contain any polyethylene.

It is another aim of the present invention to prepare impact copolymers of propylene that contain negligible amount of atactic polypropylene.

It is a further aim of the present invention to prepare impact copolymers having a good dispersion of rubber particles within the homopolymer matrix.

Accordingly, the present invention discloses a method for preparing impact copolymer of propylene, in a single reactor, without adding any ethylene in the feed.

The present invention discloses a method for preparing impact copolymers of propylene in a single reactor and without adding comonomer, that comprises the steps of:
a) providing a support;
b) depositing on the support a first metallocene catalyst component capable to produce an isotactic homopolymer of propylene having an isotactic index of at least 97% in order to produce the polypropylene matrix;
c) depositing on the same, or another, support a second metallocene component capable of creating a large number of 2-1 and 1-3 insertions in the polymer backbone in order to prepare the rubber;
d) activating the loaded support(s) with an activating agent having an ionising action before or after steps b) and c);
e) injecting the loaded and activated support(s) into the reactor;
f) injecting propylene monomer into the reactor;
g) maintaining under polymerisation conditions;
h) retrieving an impact copolymer of propylene.

In another embodiment according to the present invention, the second metallocene component of step c) is a syndiospecific metallocene catalyst component which undergoes a large number of site epimerisation errors giving rise to the formation of so-called single m stereo-error dyads.

Preferably, the support material is an inorganic oxide in its finely divided form.

Suitable inorganic oxide materials that may be employed in accordance with this invention include metal oxides such as silica, alumina and mixtures thereof. Other inorganic oxides that may be employed either alone or in combination with the silica, or alumina are for example magnesia, titania or zirconia. Other suitable support materials comprise for example finely divided functionalised polyolefins such as finely divided polyethylene.

Preferably, the support is a silica support having a specific surface area of from 200 to 700 $m^2/g$ and a pore volume of from 0.5 to 3 ml/g.

Preferably, all catalytic components are deposited onto the same support.

The first metallocene catalyst component capable of producing a highly isotactic homopolymer of propylene for the matrix is selected to have a C1 or C2 symmetry, more preferably C1 symmetry. The preferred first metallocene catalyst component is represented by formula I $$R''(CpR_n)(FluR'_m)MQ_2 \qquad (I)$$

or by formula II $$R''(IndR^2R^4)_2MQ_2 \quad (II)$$

wherein
- Cp is an unsubstituted or substituted cyclopentadienyl ring and R are substitutents in positions 2 and 4 or positions 3 and 5;
- Flu is a substituted or unsubstituted fluorenyl ring;
- Ind is an unsubstituted or substituted indenyl or tetrahydroindenyl ring and $R^2$ and $R^4$ are substituents in positions 2 and 4 respectively;
- each R', R, $R^2$ and $R^4$ is the same or different and is hydrogen or hydrocarbyl containing from 1 to 20 carbon atoms;
- R'' is a structural bridge between two Cp rings;
- M is a metal group 4 of the Periodic Table;
- Each Q is independently a hydrocarbyl radical having from 1 to 20 carbon atoms or halogen.

In the preferred first metallocene components according to the present invention, the bridged ligand contains:
- a cyclopentadienyl ring wherein the substituent in position 3 or 4 is a bulky substituent having 3 carbon atoms or more and the other substituent in positions 5 or 2 respectively has 1 or 2 carbon atoms.
- a fluorenyl ring carrying two substituents, preferably the same, respectively at positions 3 and 6 or at positions 2 and 7 or at positions 1 and 8, more preferably at positions 3 and 6.

The type of bridge is not particularly limited. Typically R'' comprises an alkylidene group having from 1 to 20 carbon atoms, a germanium group (e.g. a dialkyl germanium group), a silicon group (e.g. a dialkyl silicon group), a siloxane group (e.g. a dialkyl siloxane group), an alkyl phosphine group or an amine group. Preferably, the substituent on the bridge comprises a hydrocarbyl radical having at least one carbon. The most preferred bridge is isopropylidene $CMe_2$.

In another preferred embodiment according to the present invention, the first metallocene component is a bridged bis-indenyl wherein each indenyl carries a bulky substituent having 3 carbon atoms or more in position 4 and a small substituent having 1 or 2 carbon atoms in position 2 The preferred bridge is a dialkylsilyl.

Q is preferably halogen and most preferably Cl.

M is preferably hafnium, zirconium or titanium, more preferably zirconium.

Figure 1:
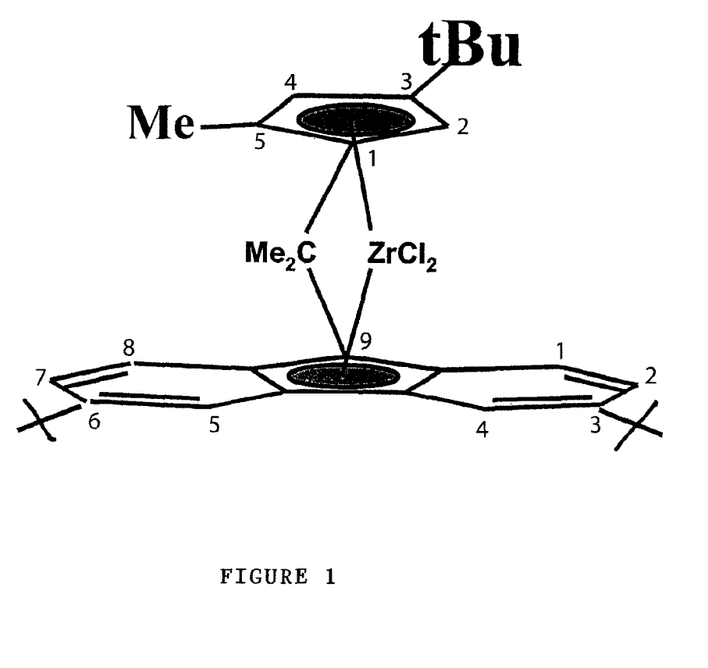
FIG. 1 represents schematically metallocene compound $Me_2C(3\text{-}t\text{-}Bu\text{-}5\text{-}Me\text{-}cyclopentadienyl)(3,6\text{-}R'\text{-}fluorenyl)ZrCl_2$.

The most preferred first metallocene components according to the present invention are isopropylidene (3-t-butyl-5-methyl-cyclopentadienyl) (3,6-t-butyl-fluorenyl) zirconium dichloride as represented in FIG. 1 and dimethylsilyl-bis(2-methyl,4-naphtyl-indenyl) zirconium dichloride.

The homopolymer of propylene produced with such metallocene catalyst component is characterised by a very high isotactic index II of at least 97%, preferably at least 98% and more preferably larger than 98%. The isotactic index is determined by NMR. In addition it has no or negligible amount of atactic fraction and it has a very high crystallinity and rigidity. The homopolymer matrix thus exhibits excellent stiffness. In addition they have a high weight average molecular weight Mw of at least 300000 and a very high melting temperature of up to 162° C. without nucleating agent and of up to 165° C. with nucleating agent.

The second metallocene component can be represented by formula III $$R''(R^*-Cp)(FluR'_m)MQ_2 \quad (III)$$

or by formula IV $$R''(FluR'_m)XMQ_2 \quad (IV)$$

or by formula V $$R''(IndR^4)_2MQ_2 \quad (V)$$

wherein
- Cp is cyclopentadienyl ring and R* is a single substituent in distal position 3 or 4 on the cyclopentadienyl ring, preferably methyl, isopropyl, phenyl or trimethylsilyl (TMS), more preferably TMS;
- Flu is a substituted or non-substituted fluorenyl ring;
- X is an hetero-atom group 13 of the periodic Table which can be substituted or non-substituted and is preferably nitrogen, phosphorus, oxygen or sulfur;
- Ind is indenyl or tetrahydroindenyl and $R^4$ is a substitutent in position 4. $R^4$ is preferably a bulky substituent having 3 carbon atoms or more. Said bulky substituent is preferably a tert-butyl or phenyl substituent;
- the other symbols are as defined in formula I and II hereabove.

The second metallocene component is selected depending upon the desired type of impact copolymer.

For low to medium impact copolymers, the preferred second metallocene component is a constrained geometry component represented by formula III wherein the fluorenyl is substituted at positions 3 and 6 or 2 and 7, more preferably 2 and 7. It produces a polymeric component having a high molecular weight, typically of from 400000 to 800000 and a large number of regio-defects, typically of about 8%. The most preferred second metallocene component for low to medium impact copolymers is $Ph_2Si(2,7\text{-t-but-fluorenyl})N\text{-t-but}$ zirconium dichloride.

Figure 2:
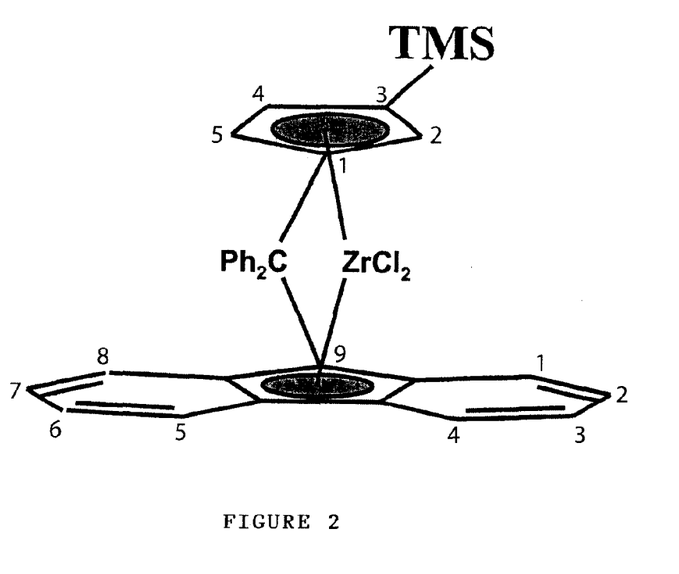
FIG. 2 represents schematically metallocene compound $Ph_2C(3\text{-}Me_3Si\text{-}cyclopentadienyl)(fluorenyl)ZrCl_2$.

For high impact copolymers, the preferred second metallocene component is represented by formula II wherein the fluorenyl group is unsubstituted and wherein R* is a trimethyl-silyl group at distal position on the cyclopentadienyl. The bridge is selected from $Me_2C$ or $Ph_2C$. It produces polymers having a low glass transition temperature Tg, typically of from 0 to −20° C., and a large number of 2,1 and 1,3 insertions, said number of misinsertions increasing with increasing polymerisation temperature. The most preferred second metallocene component for high impact copolymers is $Ph_2C(3\text{-}SiMe_3\text{-cyclopentadienyl})$ (fluorenyl) zirconium dichloride as represented in FIG. 2.

In another preferred embodiment, the second metallocene component is represented by formula IV and is a bis(4-tert-butyl-Ind) wherein the bridge is isopropylidene or dimethylsilyl.

The preferred second metallocene component is able to produce large amounts of 2-1 inversions during the polymerisation of propylene. Alternatively, it is a syndiospecific metallocene catalyst component that undergoes a large number of site epimerisation errors giving rise to the formation of so-called single m stereo-error dyads. These are thus able to produce a rubber without requiring the addition of ethylene in the feed. Such metallocene component produces low crystallinity rubbery propylene-based material with low glass transition temperature, preferably they produce polymers with long isotactic blocks and short syndiotactic blocks wherein the amount of syndiotactic polypropylene is of from 2 to 6 wt %.

The nature and amount of each metallocene component is selected according to the desired impact properties of the final impact copolymer.

The impact copolymers of the prior art can be grouped in three categories:

Medium impact copolymers typically require from 5 to 8 wt % of ethylene in the feed and a content of ethylene-propylene rubber in the homopolymer matrix of from 8 to 13 wt %. The target viscosity of the EPR is of from 2.2 to 2.8 dl/g.

High impact copolymers typically require from 9 to 12 wt % of ethylene in the feed and a content of ethylene-propylene rubber in the homopolymer matrix of from 16 to 22 wt %. The target viscosity of the EPR is of from 3 to 3.5 dl/g.

Very high impact copolymers typically require from 12 to 17 wt % of ethylene in the feed and a content of ethylene-propylene rubber in the homopolymer matrix of from 22 to 30 wt %. The target viscosity of the EPR is of from 2 to 3.5 dl/g.

These target compositions can be obtained in the present invention by varying the weight ratio of the two selected catalyst components.

The activating agent may be a mixture of activating agents in order to efficiently activate all catalytic components.

The activating agents of the present invention are selected from spherically-shaped anionogenic agents that can distribute the negative charge evenly and that have a low or no coordinating capability. Preferably, they are selected from borates, boranes and aluminates or mixtures thereof.

Suitable boron-containing compounds activating agents may comprise triphenylcarbenium boronate, such as tetrakis-pentafluorophenyl-borato-triphenylcarbenium as described in EP-A-0,427,696

$C(Ph)_3^+B(C_6F_5)_4^-$

These activators are highly effective for olefin polymerisation. Functionalised fluoroarylborate salts are preferred as they have improved solubility in hydrocarbons and improved thermal stability while keeping an excellent efficiency for olefin polymerisation. Other more preferred activating agents are perfluorophenyl borates.

Other suitable boron-containing activating agents are described in EP-A-0,277,004.

Other preferred activating agents are aluminoxanes, preferably methylaluminoxane (MAO) or modified methylaluminoxane (MMAO) that does not contain any trimethylaluminium.

Alternatively, a fluorinated activating support may be used instead of conventional support and an activating agent.

The amounts of activating agent and of total metallocene components usefully employed in the preparation of the catalyst system can vary over a wide range. When a boron-based activating agent is used, the amount of boron is near stoichiometric with respect to the total amount of metal present in the one or more metallocene catalyst components. The boron (B) to total metal ($\Sigma M$) ratio B/$\Sigma M$ is in the range between 1: and 20:1, preferably, it is about 2:1. When one or more aluminium-based activating agents are used, the total amount of aluminium is much larger than the total amount of metal present in the metallocene catalyst components. The total aluminium ($\Sigma Al$) to total metal ($\Sigma M$) ratio ($\Sigma Al$)/($\Sigma M$) is of from 100 to 3000, preferably of from 300 to 2000.

The catalyst system may be employed in a solution process, or in a slurry process, or in a gas phase process.

The conditions employed for polymerisation are not particularly limited, provided they are sufficient to effectively polymerise the particular monomer used as a starting material. The polymerisation process is preferably carried out at a temperature of from 50 to 120° C., more preferably from 60 to 110° C., under an absolute pressure of 1 to 100 bar.

Optionally, pre-polymerisation can be carried out.

The present invention is characterised by the absence of ethylene comonomer in the feed. The rubber phase results from the large amount of 2-1 insertions in the polymer backbone. For selected polymerisation conditions, the number of 2-1 insertions increases with decreasing propylene concentration in the monomer feed.

The impact copolymers obtainable by the method of the present invention offer the main advantage that, contrary to those of the prior art, they do not contain any amount of polyethylene within the rubbery phase. In addition they have an exceptionally good rigidity/impact balance. The absence of atactic phase in the homopolymer matrix leads to an excellent rigidity. The rubbery phase is homogeneously distributed in the matrix.

Figure 3:
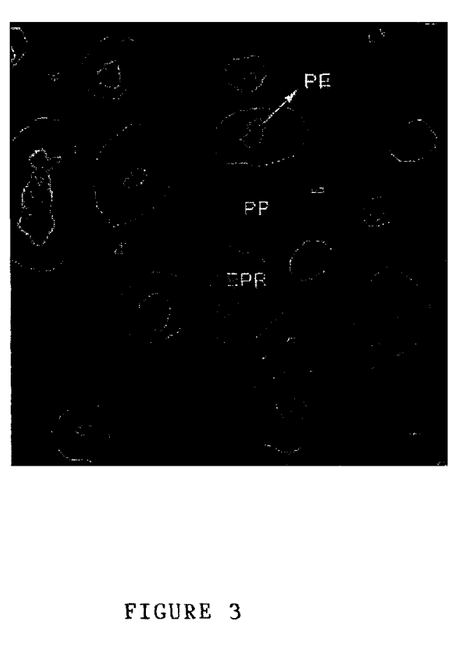
FIG. 3 represents an example of ethylene-propylene rubber dispersion in an isotactic homopolymer matrix and shows the presence of polyethylene nodules according to prior art

EXAMPLES 3 phases are present in the impact copolymers of the prior art as represented in FIG. 3 that shows the isotactic homopolymer matrix, the ethylene-propylene rubber particles and inside these particles, a polyethylene fraction. Such polyethylene fraction is no longer present in the impact copolymers of the present invention as there is no ethylene comonomer added to the feed.

Typical ZN impact copolymer products used about 10 wt % of ethylene in the feed. It has a non-negligible amount of high-density polyethylene in the rubber phase and 2.5-3 wt % of atactic polypropylene in the matrix.

Example 1

Propylene was polymerised in the presence of metallocene catalyst $(Ph_2Si)(2,7$-di-tert-butyl-fluorenyl)(tert-butyl-N)TiCl_2$. The resulting polypropylene was predominantly syndiotactic with a high percentage of regiodefects (mr 27.63%) thus having rubber-like properties. Results are shown in Table 1 below.

Example 2

Figure 4:
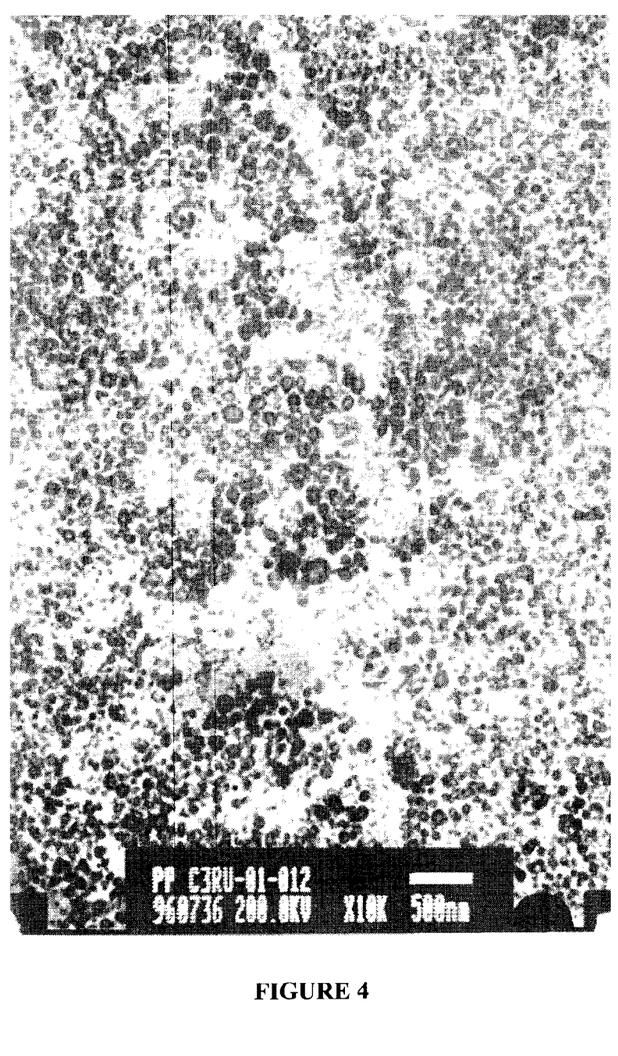
FIG. 4 represents a 10K magnified Transition Electron Microscope image of polypropylene made using $Ph_2C(3\text{-}Me_3Si\text{-}cyclopentadienyl)(fluorenyl)ZrCl_2$.
Figure 5:
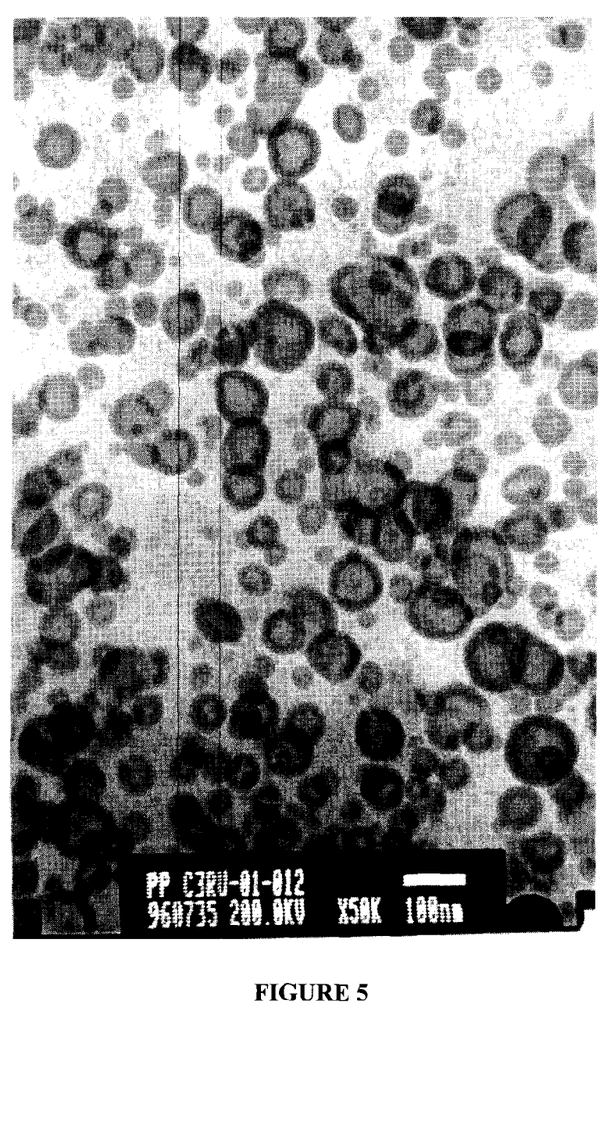
FIG. 5 represents a 50K magnified Transition Electron Microscope image of a polypropylene made using $Ph_2C(3\text{-}Me_3Si\text{-}cyclopentadienyl)(fluorenyl)ZrCl_2$.

Propylene was polymerised in the presence of metallocene catalyst $Ph_2C(3$-SiMe$_3$-cyclopentadienyl)(fluorenyl)ZrCl$_2$. The resulting polypropylene was predominantly isotactic with a high percentage of regiodefects (mr 20.88%) consequently having rubber-like properties. Results are shown in Table 1 below FIGS. 4 and 5 are TEM images of the polypropylene thus obtained, which demonstrate the homogeneous dispersion of the polypropylene particles within a solvent matrix.

TABLE 1

| | Catalyst | T poly (°C.) | Propylene/ c-hexane (wt %) | Mn kDa | Mw kDa | MWD | mm (%) | rr (%) | mr (%) | Tm (°C.) | Tg (°C.) |
|---|---|---|---|---|---|---|---|---|---|---|---|
| Ex 1 | Me$_2$C-(3-$^t$bu-5-Me- | 55 –> 60 | 30/70 | 46 | 94 | 2.1 | 5.65 | 66.72 | 27.63 | 122 | 1.4 |

TABLE 1-continued

| | Catalyst | T poly (° C.) | Propylene/ c-hexane (wt %) | Mn kDa | Mw kDa | MWD | mm (%) | rr (%) | mr (%) | Tm (° C.) | Tg (° C.) |
|---|---|---|---|---|---|---|---|---|---|---|---|
| | Cp) (3,6-$^t$bu-flu) ZrCl$_2$ | | | | | | | | | | |
| Ex 2 | Ph$_2$C-(3-Me$_3$Si-Cp) (flu) ZrCl$_2$ | 55 –> 60 | 30/70 | 25 | 84 | 3.3 | 63.55 | 15.57 | 20.88 | 131 | −20 |

Example 3

Figure 6:
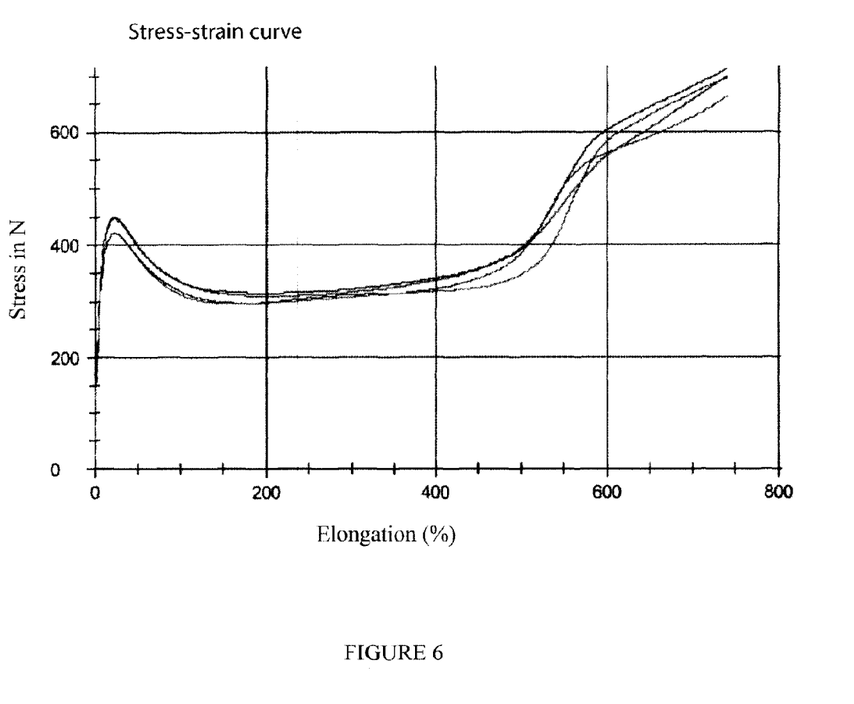
FIG. 6 represents a stress-strain curve of polypropylene made using $Ph_2C(3\text{-}Me_3Si\text{-}cyclopentadienyl)(fluorenyl)ZrCl_2$.

Propylene was polymerised in the presence of the same metallocene catalyst as in example 2. However, the ratio of propylene to solvent was increased to 50 wt %. The resulting polymer was predominantly isotactic with a high percentage of regiodefects (mr 16.52%). Results are shown in Table 2 below. FIG. 6 is a graph describing the stress-strain relationship of four polypropylene samples obtained according to this example, each sample having been polymerised under identical conditions. It clearly reveals the elastic behaviour of the rubber-like polypropylene. The slope of the linear part of the stress-strain curve is the elastic modulus. Rubber usually has an elastic modulus of 0.01-0.1 GPa. Polypropylene usually has an elastic modulus of 1.5-2 GPa. Polypropylene according to example 3 has a much lower elastic modulus (0.129 GPa) than polypropylene usually exhibits and therefore it clearly has rubber-like properties.

Example 4

Propylene was polymerised in the presence of the same metallocene catalyst as in example 2. However, the ratio of propylene to solvent was increased to 70 wt %. The resulting polymer was predominantly isotactic with a high percentage of regiodefects (mr 21%). Results are shown in Table 2 below. Polypropylene according to example 4 has a much lower elastic modulus (0.094 GPa) than polypropylene usually exhibits and therefore it clearly has rubber-like properties.

TABLE 2

| | Catalyst | T poly (° C.) | Propylene/ c-hexane (wt %) | Mn kDa | Mw kDa | MWD | mm (%) | rr (%) | mr (%) | Tg (° C.) | Tm (° C.) |
|---|---|---|---|---|---|---|---|---|---|---|---|
| Ex 3 | Ph$_2$C-(3-Me$_3$Si-Cp) (flu) ZrCl$_2$ | 40 | 50/50 | 75 | 203 | 2.7 | 67.9 | 15.58 | 16.52 | −2.2 | 92.3 |
| Ex 4 | Ph$_2$C-(3-Me$_3$Si-Cp) (flu) ZrCl$_2$ | 40 | 70/30 | 84 | 227 | 2.7 | 61.3 | 17.7 | 21 | −8.2 | 85-141 |

| | MFI2 | MFI5 | Elastic modulus (MPa) | Tensile strength at yield (MPa) | Elongation at yield (%) | Tensile strength at break (MPa) | Elongation at break (%) |
|---|---|---|---|---|---|---|---|
| Ex 3 | 12.4 | 19.3 | 129 | 8.96 | 28.33 | No break | No break |
| Ex 4 | 4.9 | 7.9 | 94 | 7.6 | 28 | 19.9 | 815 |

MFI2: Melt flow index at 230° C. with a 2.16 kg load
MFI5: Melt flow index at 190° C. with a 5 kg load (standard used for rubber)

Example 5

A high impact copolymer was prepared with a catalyst system comprising as first metallocene component Ph$_2$C-(3-tert-butyl-5-methyl-cyclopentadienyl)(fluorenyl)ZrCl$_2$ and as second metallocene component Ph$_2$C(3-Me$_3$Si-cyclopentadienyl)(fluorenyl)ZrCl$_2$. They were placed on the same silica-based support impregnated with methylaluminoxane (MAO). There was no high-density polyethylene in the rubber phase and the matrix had no atactic component.

The invention claimed is:

1. A method for preparing impact polymers of propylene in a single reactor, that comprises the steps of:
   a) providing a support;
   b) depositing on the support a first metallocene catalyst component capable of producing an isotactic homopolymer of propylene having an isotactic index of at least 97% in order to produce a polypropylene matrix, wherein the first metallocene catalyst component is CMe$_2$(3-t-butyl-5-methyl-cyclopentadienyl)(3,6-t-butyl-fluorenyl) zirconium dichloride or is represented by formula II $$R''(IndR^2R^4)_2MQ_2 \qquad (II)$$

wherein
   Ind is an unsubstituted or substituted indenyl or tetrahydroindenyl ring and $R^2$ and $R^4$ are substituents in positions 2 and 4 respectively;
   each $R^2$ and $R^4$ is the same or different and is a hydrocarbyl containing from 1 to 20 carbon atoms;
   R" is a structural bridge between two Cp rings;
   M is a metal group 4 of the Periodic Table;
   each Q is independently a hydrocarbyl radical having from 1 to 20 carbon atoms or halogen;
   and wherein the substituent in position 4 is a bulky substituent having 3 carbon atoms or more and the substituent in position 2 is a small substituent having 1 or 2 carbon atoms;
   c) depositing on the same, or another, support a second metallocene component in order to prepare a rubber phase, wherein the second metallocene catalyst component is $Ph_2C(3-SiMe_3$-cyclopentadienyl)(fluorenyl)zirconium dichloride;

d) activating the loaded support(s) with an activating agent having an ionising action before or after steps b) and c);

e) injecting the loaded and activated support(s) into the reactor;

f) injecting propylene into the reactor;

g) maintaining under polymerisation conditions; and h) retrieving an impact polymer of propylene devoid of ethylene comonomer.

2. The method of claim 1 wherein the first metallocene component is dimethylsilyl-bis(2-methyl,4-naphtyl-indenyl) zirconium dichloride.

* * * * *